June 30, 1970 — D. G. SCOTT — 3,517,971
VARIABLE LOAD BRAKE CONTROL APPARATUS
Filed Sept. 6, 1968
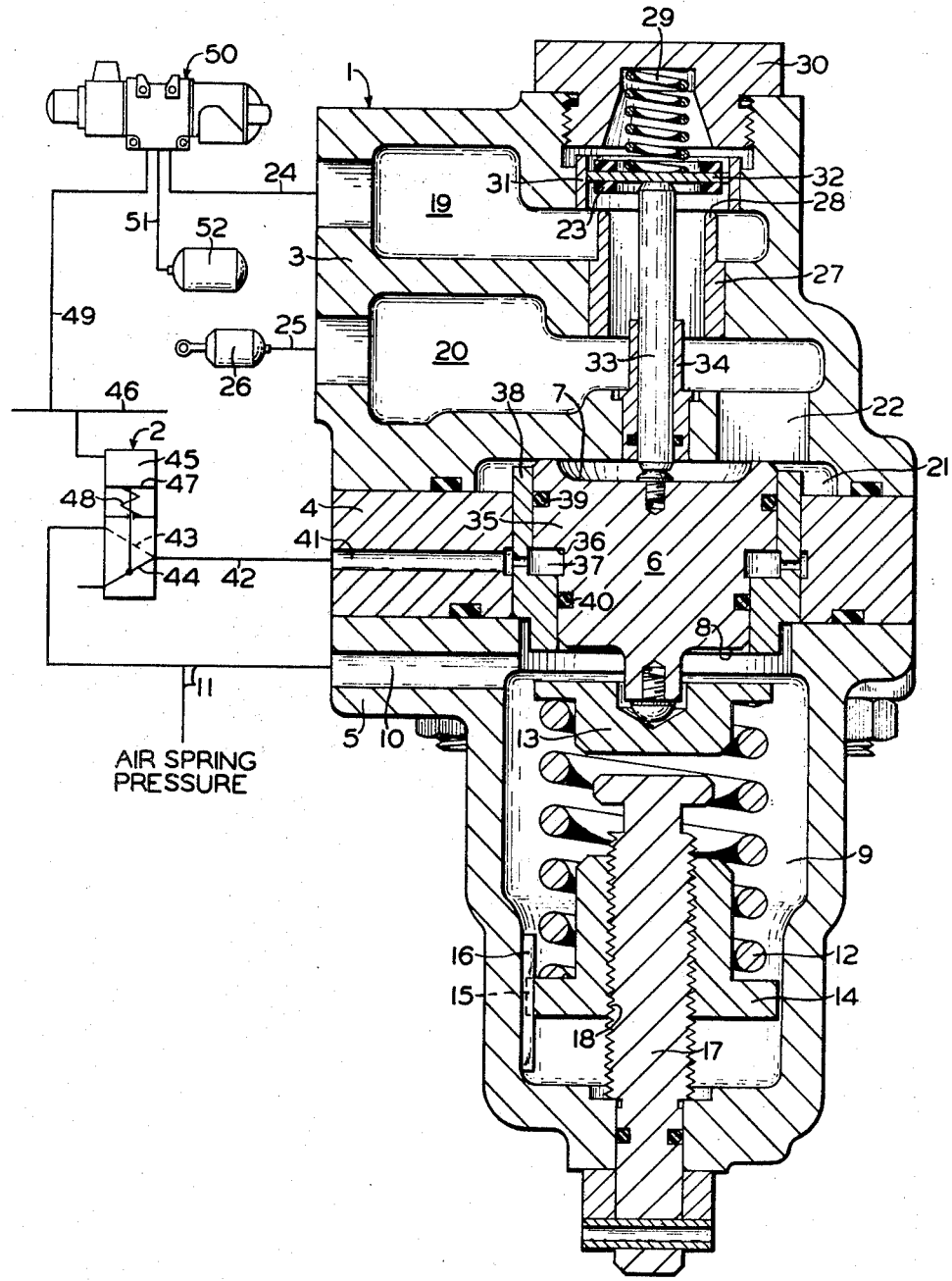
INVENTOR.
DANIEL G. SCOTT
BY
*A. A. Steinmiller*
ATTORNEY United States Patent Office 3,517,971
Patented June 30, 1970

3,517,971
VARIABLE LOAD BRAKE CONTROL APPARATUS
Daniel G. Scott, Apollo, Pa., assignor to Westinghouse Air Brake Company, Wilmerding, Pa., a corporation of Pennsylvania
Filed Sept. 6, 1968, Ser. No. 758,081
Int. Cl. B60t 8/26, 8/18
U.S. Cl. 303—22                                             6 Claims

ABSTRACT OF THE DISCLOSURE

Variable load brake control apparatus for effecting delivery of actuating fluid to a vehicle brake cylinder at a pressure according to a control pressure established by the vehicle operator for effecting a brake application at a degree corresponding to the established control pressure, said variable load brake control apparatus including means for restricting to a maximum pressure limit commensurate with the load condition of the vehicle the pressure of control fluid, and being further characterized by means automatically responsive to an emergency brake application for effecting an increase in said maximum pressure limit and a corresponding increase in the degree of brake application effective during an emergency situation.

BACKGROUND OF THE INVENTION

As is well known to those skilled in the art, it is ideally desirable to control braking operations on a vehicle such that over-braking and consequent wheel-locking and wheel-sliding may be avoided. Since the load condition of the vehicle is a factor to be reckoned with, many of the existing brake equipments, particularly on railway vehicles, not only include means for limiting brake applications to a certain maximum degree to prevent overbraking on the particular vehicle involved, but are also provided with means for recognizing the load condition of the vehicle and thereby governing the braking equipment for limiting the brake application to a maximum degree according to the existing vehicle load during normal braking operation under normal conditions. In emergency situations, however, it may be desired to exceed such maximum degree of brake application, even at the risk of sliding or locking the vehicle wheels.

SUMMARY OF THE INVENTION

It is the object of the present invention, therefore, to provide variable load brake apparatus for effecting a brake application at a degree corresponding to that initiated by the operator through his controls, but for limiting such application to a maximum degree commensurate with the existing load condition of the vehicle, said brake apparatus being characterized by means responsive to an emergency brake application, when initiated by the operator, for effecting a brake application at a correspondingly higher degree than said maximum degree.

Briefly, the variable load brake control apparatus embodying the invention comprises a variable load valve device having a normally unseated valve member past which operating fluid under pressure may be supplied to the brake cylinder under the control of the operator, said variable load valve device also including a piston member operable responsively to prevailing fluid pressure acting on one side thereof, at a degree determined by the existing vehicle load, for holding said valve member in its unseated position, and being operable responsively to the pressure of said operating fluid acting on the opposite side, at a degree sufficient for counterbalancing the effect of the pressure acting on said one side, for causing said valve member to be operated to a closed position in which further flow of operating fluid to the brake cylinder is cut off. The variable load brake control apparatus further comprises a supplementary relay valve device operable responsively to an emergency brake application, when initiated by the operator, for subjecting the piston member of the variable load valve device to additional fluid pressure to supplement that acting on the one side thereof so that a higher degree of operating fluid pressure acting on the opposite side of the piston member is required to counterbalance the combined effect of the respective pressures acting on said one side, thereby resulting in a greater degree of brake application before cut-off of operating fluid under pressure to the brake cylinder occurs.

The single-figure drawing is a diagrammatic view, shown mainly in section, of a variable load brake control apparatus embodying the invention.

DESCRIPTION AND OPERATION

As shown in the drawing, the variable load brake control apparatus comprises a variable load valve device 1 and a relay valve device 2.

The variable load valve device 1 comprises, as viewed in the drawing, an upper casing section 3, an intermediate casing section 4, and a lower casing section 5.

A piston member 6, reciprocably operable in the intermediate casing section 4 and the lower casing section 5, has an upper pressure area 7 adjacent the upper casing section 3 and a lower pressure area 8 adjacent said lower casing section, said lower pressure area being smaller than said upper pressure area.

The lower pressure area 8 is exposed and subject to a control pressure in a spring chamber 9 formed in the lower casing section 5 and charged, in this instance, with air spring pressure via a passageway 10 formed in said lower casing section and connected to the vehicle air springs (not shown) via a pipe 11. The degree of control pressure or air spring pressure in spring chamber 9, therefore, is determined by and reflects the existing load condition of the vehicle. A biasing or tuning spring 12 cooperates with the control pressure in spring chamber 9 for urging the piston member 6 toward a supply position, which will be defined hereinafter. Spring 12 is compressed between a spring seat 13, which rests against the lower end of piston member 6, and an oppositely disposed spring seat 14. The spring seat 14 is fixed against rotation by having a notch 15, formed adjacent the periphery thereof, riding on an axially disposed rib 16 formed on the inner wall of lower casing section 5. The axial position of spring seat 14 relative to spring 13, and therefore the compression of spring 12, may be adjusted by turning an adjusting screw 17 having one end screwed into a threaded bore 18 of the spring seat 14 and the other end, by which the screw is turned, extending outside the lower casing section 5.

The upper casing section 3 has formed therein a supply chamber 19 and a delivery chamber 20, said upper casing section cooperating with the intermediate casing section 4 and piston member 6 to define a piston chamber 21 communicating with said delivery chamber via a passageway 22, the upper pressure area 7 being subjected, therefore, to fluid pressure prevailing in said delivery and piston chambers. A check valve 23 is disposed in the upper casing section 3 and cooperates (in a manner to be hereinafter disclosed) with piston member 6 for controlling communication and, therefore, flow of fluid under pressure between supply chamber 19, which is supplied via a pipe 24 with operating fluid at a controlled pressure from a source of fluid under pressure (to be hereinafter identified), and delivery chamber 20, from which said operating fluid is delivered via a pipe 25 to a brake cylinder device 26.

A valve seat member 27 is fixed in a separating wall in upper casing section 3 between the supply chamber 19 and delivery chamber 20, said valve seat member having formed on the upper end thereof, as viewed in the drawing, an annular valve seat 28. The check valve 23 is urged toward a seated or closed posiiton on valve seat 28 by a spring 29 compressed between said check valve and a cap nut 30 screwed into said upper casing section. When check valve 23 is in its seated or closed position on valve seat 28, communication between supply chamber 19 and delivery chamber 20 is cut off, and, of course, when in an unseated or open position, such communication, is open. Check valve 23 which is axially slidably disposed in a bushing 31 coaxially fixed in upper casing section 3, is provided with a plurality of openings spaced about its periphery, such as the one shown at 32, whereby fluid pressure prevailing in supply chamber 19 equalized over both sides of said check valve when in its unseated or open position.

A piston stem 33 is slidably disposed in a guide bushing 34 fixed in an end wall of upper casing section 3 adjacent intermediate casing section 4, so that said stem is axially aligned with and between check valve 23 and piston member 6 to make contact with the lower and upper sides of said check valve and piston member, respectively. Thus, upon upward movement of piston member 6 to its supply position, in which it is shown and wherein it engages the lower face of upper casing section 3, check valve 23 is lifted from valve seat 28 by piston stem 33 and held in its unseated or open position until subsequent downward movement of said piston member to a cut-off position (to be hereinafter described) renders spring 29 effective for moving said check valve to its seated position on said valve seat.

According to the invention, piston member 6 has an annular shoulder 35 surrounding said piston member between the axial extremities thereof so as to provide an intermediate or supplementary pressure area 36 (for a purpose to be hereinafter disclosed). Supplementary pressure area 36 is subjectable to fluid pressure in a supplementary chamber 37 formed cooperatively by shoulder 35 and a bushing 38 coaxially fixed in intermediate casing section 4 and in which bushing said piston member is reciprocably operable. Appropriately disposed sealing rings 39 and 40 prevent leakage of pressurized fluid from one to the other of the several chambers 21, 37 and 9.

A passageway 41 formed in intermediate casing section 4 connects supplementary chamber 37 via a pipe 42 to one end of a normally closed supply communication or passageway 43 (shown diagrammatically by a broken line) in the relay valve device 2. The other end of passageway 43 is connected to air spring pressure via a branch section of pipe 11, which as above noted, is charged with air spring fluid pressure. Normally, supplementary chamber 37 is vented to atmosphere via passageway 41, pipe 42, and an atmospheric communication or passageway 44 (designated diagrammatically by a solid line) in the relay valve device 2.

The relay valve device 2, which is represented diagrammatically in the drawing, also comprises a pressure chamber 45 normally charged via a brake pipe 46 with brake pipe pressure which acts on one side of a piston 47 in opposition to the force of a biasing spring 48 acting on the opposite side of said piston. Brake pipe pressure in pressure chamber 45, unless reduced below a certain critical value (as will later be explained), is normally sufficient for operating piston 47, against the biasing effect of spring 48, to a venting position in which valve means (not shown) in the relay valve device 2 causes the supply communication 43 to be closed and the atmospheric communication 44 to be opened. Upon reduction of brake pipe pressure below the certain critical value above-mentioned, piston 47 is biased by spring 48 to a charging position in which atmospheric communication 44 is closed and supply communication 43 is opened.

A branch pipe 49 connects brake pipe 46 to a brake control valve device 50, which is also connected via a pipe 51 to a source of fluid under pressure such as a storage reservoir 52 and via pipe 24 to the supply chamber 19 of variable load valve device 1 for a purpose to be disclosed hereinafter.

For the purpose of considering the operation of the variable load brake control apparatus embodying the invention, it will be assumed that such apparatus is incorporated in the brake control equipment of a railway vehicle and, therefore, that pressure chamber 45 in the relay valve device 2 is charged with brake pipe pressure and that spring chamber 9 in the variable load valve device 1 is charged with air spring pressure, so that supplementary chamber 37 is vented to atmosphere and piston member 6 is in its supply position in which check valve 23 is held open by piston stem 33. As is well known to those skilled in the art, the operator initiates a brake application by effecting a reduction of pressure in the usual manner (a detailed description of which is not deemed essential to an understanding of this invention) in the brake pipe 46 which may be normally charged with fluid at a pressure of 70 p.s.i., for example. Assuming that the operator does initiate a brake application (other than an emergency application which will be considered later), that is, a service application, such an application, even if it were a full-service application necessitating a maximum reduction of some 20 p.s.i. in brake pipe pressure, would not cause a sufficient reduction in the pressure chamber 45 of the relay valve device 2 to render spring 48 effective for moving piston 47 to its charging position. This is so because the spring 48 is intentionally selected with a compression rating that requires a reduction of pressure in pressure chamber 45 on the order of 50 p.s.i. or more, for example, which is substantially greater than the maximum reduction required (in this case, 20 p.s.i.) for a full-service application, in order to render said spring effective for moving said piston to its charging position. The purpose for this will become evident hereinafter. Thus, supplementary chamber 37 in the variable load valve device 1 remains open to atmosphere via passageway 41, pipe 42, and communication 44 during such time that a service application is in effect.

A reduction of brake pipe pressure effected by the operator for initiating a service application effects operation of the brake control valve device 50 in the usual manner (a detailed description of which is not deemed essential to an understanding of the present invention) to thereby cause fluid, at a preselected pressure determined by the degree of such pressure reduction in the brake pipe 46, to be supplied via pipe 24 from the reservoir 52 to the supply chamber 19 in the variable load valve device 1, whence it flows past the unseated check valve 23 to delivery chamber 20 and, via pipe 25, to the brake cylinder 26 for effecting the brake application. At the same time, such operating fluid flows through passageway 22 into piston chamber 21 to act on pressure area 7. If the pressure of operating fluid in piston chamber 21 and, therefore, the force of such pressure acting on pressure area 7 is insufficient for overcoming the opposing combined forces of tuning spring 12 and air spring pressure acting on pressure area 8, piston member 6 remains in its supply position and check valve 23 is thereby held in its unseated position. Under such circumstances, if the operator initiates a release of the brake application by causing the brake pipe 46 to be recharged to its normal pressure of 70 p.s.i., such recharging of the brake pipe effects operation of the brake control valve device 50 in a conventional manner (a detailed description of which is not considered necessary to an understanding of the present invention) to cause further supply of operating fluid under pressure to supply chamber 19, and therefore to the brake cylinder 26, to be cut off and to cause said brake cylinder, piston chamber 21, delivery chamber 20, and supply chamber 19 all to be relieved of such operating fluid under pressure without causing any change in the respective positions of piston member 6 and check valve 23.

On the other hand, if the degree of a brake application already in effect is increased by the operator or a brake application is initiated, either of which requires an operating fluid pressure equivalent to or exceeding what may be called a cut-off pressure, that is, a pressure which produces an opposing force acting on pressure area 7 of piston member 6 sufficient for counterbalancing the combined force of spring 12 and air spring pressure acting on pressure area 8, said piston member is moved downwardly by said opposing force to its cut-off position with stem 32 moving along therewith and thereby rendering spring 29 effective for seating check valve 23 on valve seat 28. With check valve 23 in its seated position, flow of operating fluid under pressure from supply chamber 19 to delivery chamber 20, and therefore to the brake cylinder 26 is cut off, notwithstanding that the operator may effect an increase of pressure of such operating fluid in said supply chamber to a degree exceeding that of the cut-off pressure above defined. Moreover, once seated, the check valve 23 is held in its seated position by spring 29 and the pressure of operating fluid in supply chamber 19 acting on the upper side of said check valve by flowing through the openings 32, until such time that said pressure acting on the upper side is reduced sufficiently to render the pressure in delivery chamber 20 acting on the area within the valve seat 28 on the underside of said check valve effective for unseating said check valve. Thus, the maximum pressure of operating fluid deliverable to the brake cylinder, that is, the equivalent of cut-off pressure, is limited by the existing load condition of the vehicle since it is said load condition that governs the degree of air spring pressure in spring chamber 9 which, in turn, produces the force acting on pressure area 8, along with that of spring 12, that must be overcome by the force of operating pressure in delivery chamber 20.

Under normal circumstances, therefore, and as above described, the variable load valve device 1 operates to effect any degree of service application up to a certain maximum for the existing load condition.

Assuming, however, that the circumstances are such that an emergency brake application is called for, the operator causes brake pipe pressure to be reduced to atmosphere in the least time possible. Such action again causes operating fluid under pressure to be supplied from the reservoir 52, via pipe 24, to the supply chamber 19. At the same time and according to the invention, pressure in pressure chamber 45 of the relay valve device 2, which is brake pipe pressure, is also reduced to atmosphere, thereby rendering spring 48 effective for moving piston 47 to its charging position in which, as above noted, atmospheric communication 44 is closed and charging communication 43 is opened. With communication 43 open, air spring pressure in pipe 11 may flow through said communication to pipe 42 and, via passageway 41, to supplementary chamber 37 in the variable load valve device 1.

Air spring pressure in supplementary chamber 37, of course, is effective on the supplementary pressure area 36 so that the resulting force therefrom is added to and acts in the same direction as the combined forces of spring 12 and air spring pressure in spring chamber 9, thereby requiring a higher cut-off pressure of operating fluid acting on pressure area 7 of piston member 6 in one direction to counterbalance the opposing forces above noted, acting in the opposite direction on said piston member for moving it to its cut-off position. Since a higher cut-off pressure of operating fluid is required to effect operation of piston member 6 to its cut-off position, in which check valve 23 is seated to cut off delivery of such operating fluid to the brake cylinder, it is evident that a higher maximum braking effort is thus obtained when an emergency application is initiated.

Release of the brake application is effected in the same manner, as above described, in all situations, that is, by the operator causing the brake pipe 46 to be recharged, in this case, to its normal 70 p.s.i. Recharging of brake pipe 46 also recharges chamber 45 of relay valve device 2 to thereby effect operation of piston 47 to its venting position in which charging communication 43 is closed and venting communication 44 is opened for venting supplementary chamber 37 in the variable load valve device 1 to atmosphere. If the brake application to be released is one less than a maximum application (in which case, as above noted, check valve 23 is in its unseated or open position), operating fluid under pressure from the brake cylinder simply flows back through pipe 25, delivery chamber 20, past the unseated check valve, through supply chamber 19 and via pipe 24 to an atmospheric vent (not shown) in the brake control valve device 50. Of course, fluid under pressure in piston chamber 21 is exhausted via the same course. If the application to be released is a maximum application for the existing load and was effected either as a full-service application or an emergency application (in which case piston member 6 is in its cut-off position and check valve 23 is in its seated position), release of operating fluid pressure in supply chamber 19 causes a similar reduction of fluid pressure acting on the upper side of said check valve, so that when the pressure acting on said upper side of the check valve is reduced to a certain low value, fluid pressure in delivery chamber 20 acting on the area of the under side of said check valve enclosed within the valve seat 28 becomes effective for overcoming spring 29 and unseating said check valve. With check valve 23 unseated, operating fluid pressure from the brake cylinder and piston chamber 21 is vented to atmosphere via the same course described above in connection with the less-than-maximum brake application. When operating fluid pressure acting on pressure area 7 of piston member 6 has reduced sufficiently to permit the opposing forces acting on pressure area 8 to prevail, said piston member is operated to its supply position for holding check valve 23 in its unseated or open position.

Having now described the invention, what I claim as new and desire to secure by Letters Patent, is:

1. A pressure regulating valve device comprising the combination of a valve member having a normally open position for establishing a fluid pressure supply communication, piston means subject to a force including a control fluid pressure urging said piston in one direction to hold said valve member in its open position and moved in the opposite direction responsively to build-up thereon of fluid pressure in said supply communication to a certain maximum pressure acting in opposition to the control fluid pressure to cause said valve member to be moved to a closed position, wherein the improvement comprises fluid pressure responsive means selectively subjected to said control fluid pressure to exert an additional force on said piston means in said one direction whereby to prevent closing of said valve until the maximum pressure in said supply communication attains a predetermined value higher than said certain maximum pressure.

2. A pressure regulating valve device, as defined in claim 1, wherein the fluid pressure responsive means comprises a differential pressure area formed on said piston means.

3. A pressure regulating valve device, as defined in claim 2, wherein said piston means has a first pressure area at one end thereof subject to the first-mentioned force and a second pressure area at the opposite end subject to fluid pressure in said supply communication, and said differential pressure area is disposed on said piston means between said first and said second pressure areas.

4. A pressure regulating valve device, as claimed in claim 1, wherein the said control fluid pressure corresponds to the load on a vehicle and the fluid supplied through said supply communication controls the brakes on the vehicle.

5. The combination with the pressure regulating valve device, as defined in claim 2, of relay valve means having a piston effective when subjected to fluid pressure in excess of a certain degree for operating the relay valve means to a position venting said differential pressure area to atmosphere, and effective upon a predetermined reduction of the fluid pressure acting thereon from said certain degree, for operating the relay valve means to a charging position for causing said differential pressure area to be subjected to fluid pressure for exerting said additional force on said piston means in said one direction.

6. A fluid pressure operable vehicle brake control apparatus comprising a brake pipe normally charged with fluid at a certain pressure; a brake cylinder; a brake control valve device operable responsively to a reduction of fluid pressure in said brake pipe for effecting supply of fluid under pressure through a communication to said brake cylinder for causing a brake application to be effected on the vehicle; and a variable load valve device interposed in said communication and comprising a normally unseated valve controlling the supply of said fluid under pressure through said communication, and piston means subject to a predetermined normal biasing force including a control fluid pressure corresponding in degree to the load on the vehicle and acting in one direction to effect unseating of said valve and subject to the opposing pressure of fluid in said communication exerting a counterbalancing force acting in the opposite direction to cause operation of said valve to a closed position; wherein the improvement comprises:

(a) a differential pressure area formed on said piston means, and
(b) a relay valve device operable responsively to fluid pressure in said brake pipe in excess of a certain degree to a venting position in which said differential pressure area is vented to atmosphere, and operable responsively to a predetermined reduction of pressure in said brake pipe from said certain degree to a charging position in which said differential pressure area is subjected to said control fluid pressure for supplementing said normal biasing force acting in said one direction.

References Cited
UNITED STATES PATENTS

| | | |
|---|---|---|
| 2,940,796 | 6/1960 | Ortmann et al. |
| 3,147,044 | 9/1964 | Glass. |
| 3,369,846 | 2/1968 | Scott. |

MILTON BUCHLER, Primary Examiner

J. J. McLAUGHLIN, JR., Assistant Examiner

U.S. Cl. X.R.

303—40